United States Patent [19]
Ueda et al.

[11] Patent Number: 5,400,155
[45] Date of Patent: Mar. 21, 1995

[54] HOLOGRAM INFORMATION FORMING METHOD

[75] Inventors: Akihiko Ueda; Hirokuni Monzen; Hirokazu Aritake; Masayuki Kato; Masato Nakashima, all of Kawasaki, Japan

[73] Assignee: Fujitsu Limited, Kawasaki, Japan

[21] Appl. No.: 134,825

[22] Filed: Oct. 12, 1993

[30] Foreign Application Priority Data

Oct. 14, 1992 [JP] Japan .................. 4-275838

[51] Int. Cl.$^6$ .................. G03H 1/08; G03H 1/26
[52] U.S. Cl. .................. 359/9; 359/21; 359/22; 359/23; 359/25
[58] Field of Search .......... 359/9, 10, 11, 21, 22, 359/23, 25, 26

[56] References Cited

U.S. PATENT DOCUMENTS

| | | | |
|---|---|---|---|
| 4,669,812 | 6/1987 | Hoebine | 359/25 |
| 4,778,262 | 10/1988 | Haines | 359/23 |
| 5,138,471 | 8/1992 | McGrew | 359/21 |
| 5,237,433 | 8/1993 | Haines et al. | 359/26 |

*Primary Examiner*—Martin Lerner
*Attorney, Agent, or Firm*—Staas & Halsey

[57] ABSTRACT

A hologram surface to express a phase distribution, a visual field in which a solid image can be seen; and a stereoscopic display limit are set in a virtual space. A target to be stereoscopically displayed is subsequently expressed in the virtual space by a set of micro polygons. A plurality of slice planes which are parallel with the horizontal plane are set into the virtual space including the target. The line segments which intersect the polygons are obtained for every slice plane. The detected line segment is divided or clipped as necessary and is finally divided into the portion which can be always seen from the whole region of the visual field and a portion which is obstructed by another line segment and can be seen from only a part of the visual field, thereby extracting the line segment. In the calculation of a phase distribution, sampling points are set onto the extracted line segment, a 1-dimensional hologram phase distribution on the hologram surface is calculated for every sampling point, and the calculated 1-dimensional hologram phase distributions are added to every slice plane.

17 Claims, 18 Drawing Sheets

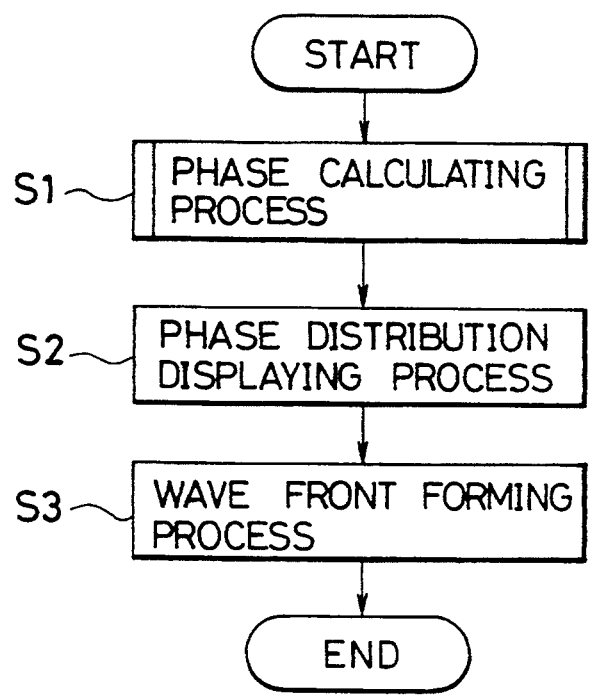
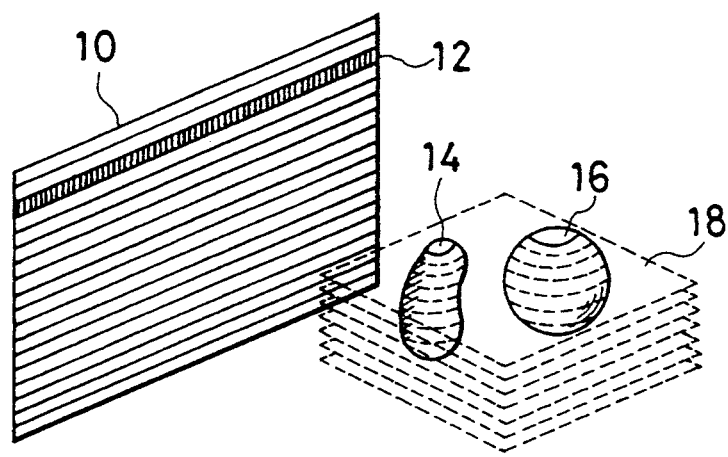

| SEGMENT NO. |  |
|---|---|
| SEGMENT LEFT END POINT | SEGMENT RIGHT END POINT |
| VISUAL FIELD LEFT END POINT | VISUAL FIELD RIGHT END POINT |

| #001 | |
|---|---|
| P1 | P2 |
| W1 | W2 |

| SEGMENT NO. ||
|---|---|
| SEGMENT LEFT END POINT | SEGMENT RIGHT END POINT |
| VISUAL FIELD LEFT END POINT | DISTURBING SEGMENT END POINT |

| #002 ||
|---|---|
| P12 | P2 |
| W1 | P3 |

| SEGMENT NO. ||
|---|---|
| SEGMENT LEFT END POINT | SEGMENT RIGHT END POINT |
| DISTURBING SEGMENT END POINT | VISUAL FIELD RIGHT END POINT |

| #003 ||
|---|---|
| P1 | P12 |
| P4 | W2 | he HOLOGRAM INFORMATION FORMING METHOD

BACKGROUND OF THE INVENTION

The invention relates to a hologram information forming method which can perform a natural stereoscopic display by using an electronic device and, more particularly, to a hologram information forming method for efficiently calculating a hologram phase distribution from a 3-dimensional structure and performing a stereoscopic display.

The stereoscopic display is means for enabling a depth or thickness structure of a 3-dimensional object to be easily visually understood and is strongly demanded in the display of a structure designed by a CAD or the like, the display of a medical image, or the like. A solid image is impressive as compared with the 2-dimensional display and is also used in a display for amusement or the like at amusement parks, movies, or the like.

Various kinds of methods have already been proposed with respect to the stereoscopic display. There is a hologram as means for enabling a solid image to be seen without attaching special glasses. The hologram is obtained by recording an object image onto a photographing dry plate by using an interference operation of the light. With regard to a still object, a color hologram having enough depth feeling has already been produced. However, in the recording to the photographing dry plate, it takes a time for a developing process and the display contents cannot be rewritten, so that the above means is inconvenient as a stereoscopic display system. In recent years, with the progress of a technique for realizing a high fineness of a liquid crystal display apparatus, an apparatus for electronically displaying a hologram by a liquid crystal display has been proposed (JP-A-64-84993). In case of electronically displaying a hologram by a liquid crystal display or the like, it is necessary to obtain a phase distribution of the hologram by calculations. The calculation of the phase distribution of the hologram is executed by product summing the phase contribution from respective points constructing a 3-dimensional object with respect to each point on the hologram.

On the other hand, there is a computer graphics (CG) method as a method for enabling a target having a 3-dimensional structure formed by a CAD or the like to be stereoscopically seen. The computer graphics is a technique such that 2-dimensional images when a target is seen from predetermined visual points are calculated and a stereoscopic feeling is really expressed in consideration of the reflection or shadow of the light. Since the computer graphics intends to display a 2-dimensional image, even when the observing position changes, only the same image is seen and a stereoscopic feeling is insufficient.

Hitherto, when a hologram phase distribution is calculated from the shape data of a 3-dimensional object, a 3-dimensional hidden line process is needed. Such a process corresponds to a technique for realizing a phenomenon that is peculiar to the stereoscopic observation such that an image can be seen by changing a visual point. However, in the hidden line process which permits that the visual point is freely changed in a 3-dimensional space, with respect to all of the points constructing a target, it is necessary to obtain a space distribution of the visual point at which each point can be seen and to obtain a calculating region of the phase distribution on the hologram and an amount of calculations in this instance is extremely large.

Specifically speaking, as shown in FIG. 1, when target objects 14 and 16 to be displayed in a space between a hologram plane 10 and a visual field 26 in which a stereoscopic display can be recognized, the calculation of the phase distribution regarding a point P on the hologram forming surface 10 is set as follows.

(I) When the point P of the target object 14 is seen from the visual field 26, a visual field portion 62 in which the P point can be seen and which is shown by a hatched region in which a visual field portion that is hidden by the object 16 existing on this side when the P point of the target object 14 is seen from the visual field 26 was eliminated is calculated.

(II) Subsequently, with respect to the visual field portion 62 in which the P point can be seen, a region of the hatched portion which crosses the hologram plane 10 that passes through the P point of the target object is obtained as a calculating region 60 of a phase distribution regarding the P point.

(III) The calculating region 60 is divided into micro regions and a phase distribution due to the light from the P point is calculated for each of the micro regions.

Since such calculations are executed with respect to all of the points of the target objects 14 and 16, an amount of calculations for them is extremely large. According to the processing speed of the present computer, it is difficult to calculate the phase distributions in a time which can be put into practical use as a display. It is a large subject to reduce such an extremely large amount of calculations.

SUMMARY OF THE INVENTION

According to the invention, there is provided a hologram information forming method whereby a calculation amount when a hologram phase distribution is obtained is reduced. According to the invention, a hologram surface to express the phase distribution, a visual field in which a solid image that is reconstructed by the phase distribution expressed on the hologram surface can be seen, and a stereoscopic display limit are first set into a virtual space. A target to be stereoscopically displayed is subsequently displayed in the virtual space by a set of micro polygons. A plurality of slice planes which are parallel with the horizontal plane are set in the virtual space including the object. A line segment which crosses the polygon is obtained every slice plane. The line segment is divided or clipped as necessary. The line segment is further divided into a portion which can be always seen from the whole region of the visual field and a portion which is obstructed by another line segment and can be seen from only a part of the visual field, and those portions are extracted. Sampling points are set to the line segment. A 1-dimensional phase distribution on the hologram surface is calculated for every sampling point. The one-dimensional hologram phase distributions calculated for the different sampling points are added for every same slice plane.

According to such a hologram information forming method of the invention as mentioned above, a 2-dimensional hidden line process of the computer graphics technique is modified and applied to the 3-dimensional structure data of the target held in a computer such as a CAD or the like, so that a 3-dimensional hidden line process which is necessary to set a calculating region of the hologram phase distribution can be simplified. On the other hand, by using a 1-dimensional hologram having a parallax in only the horizontal direction as a hologram to be formed, the hidden line process and the calculations of the phase distribution can be simplified and an amount of calculations can be reduced.

The above and other objects, features, and advantages of the present invention will become more apparent from the following detailed description with reference to the drawings.

BRIEF DESCRIPTION OF THE DRAWINGS

FIG. 2 is a flowchart showing a whole processing procedure according to the invention;

FIG. 3 is an explanatory diagram showing the relation between the 1-dimensional phase distribution which is obtained in the invention and the target object;

DETAILED DESCRIPTION OF THE PREFERRED EMBODIMENTS

Figure 1:
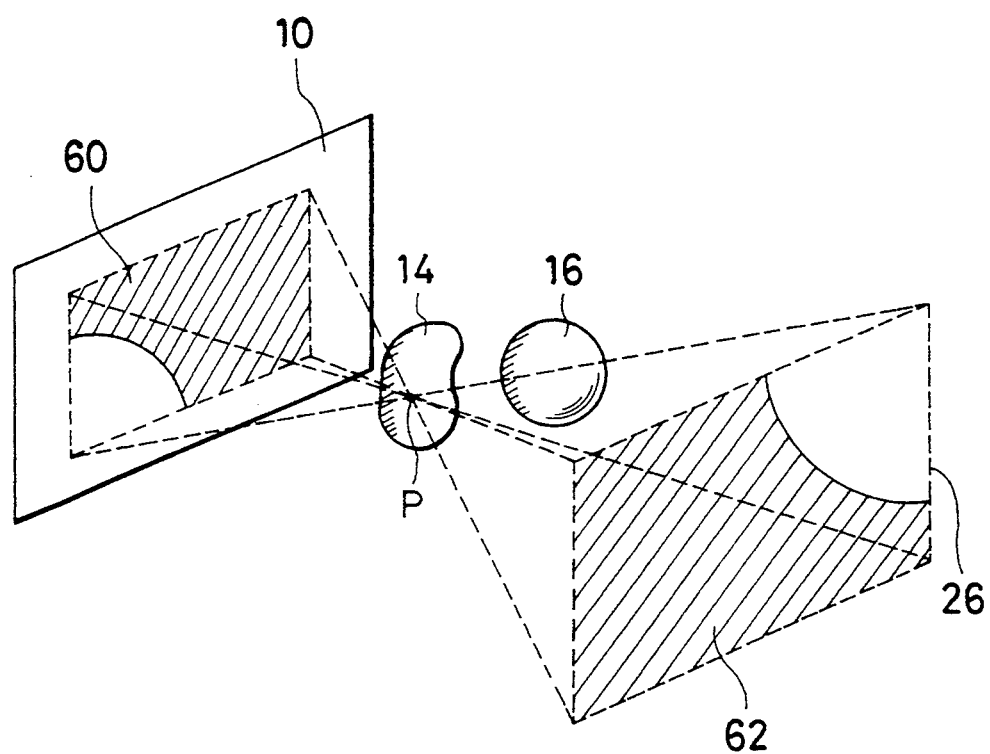
FIG. 1 is an explanatory diagram of a calculating region of a conventional hologram phase distribution.

A flowchart of FIG. 2 shows a whole processing procedure of a stereoscopic display method including a hologram information forming method according to the invention. First, in a phase calculating process in step S1, a hologram phase distribution for stereoscopic display is calculated in accordance with the hologram information forming method of the invention. The phase calculating process in this instance is executed as schematically shown in FIG. 3. That is, 3-dimensional information of the target objects 14 and 16 to be stereoscopically displayed is expressed in a virtual space prepared for phase calculation from a system such as a CAD system or the like in which 3-dimensional structure data has been held. By modifying and applying a 2-dimensional hidden line process in the computer graphics technique to the target objects 14 and 16 each having a 3-dimensional structure, a phase calculating region is determined and phase calculations in which a calculation amount was remarkably reduced are executed. For this purpose, according to the invention, a 1-dimensional hologram having a parallax in only the horizontal direction is calculated. Namely, the hologram surface 10 as a phase display surface is divided in the stripe-shaped regions each having a micro width in the vertical direction. The stripe-shaped region is divided into micro regions each having a micro width in the vertical direction of the target objects 14 and 16 in correspondence to the stripe-shaped regions. Sampling points are set in the divisional regions of the target objects 14 and 16 and phase contributions from the sampling points are product summed, thereby obtaining a 1-dimensional hologram 12.

Further, according to the invention, since each of the target objects 14 and 16 is generally expressed as a polygon which is expressed by a set of micro triangular elements, a number of slice planes 18 which are parallel with the horizontal plane are set of micro intervals in the vertical directions, thereby slicing the target objects. Subsequently, line segments which are obtained by the intersection between each slice plane 18 and the triangular elements constructing the target objects 14 and 16 are extracted. Those line segments are regarded as target objects 14 and 16 and a phase distribution of the 1-dimensional hologram 12 is calculated. It is now assumed that the interval in the vertical direction of the slice planes 18 is equalized to an interval between the hologram planes 10 to express the 1-dimensional hologram 12. According to the invention as mentioned above, since the target objects 14 and 16 are cut by the slice planes 18 and are handled as line segments in the horizontal direction, so that the calculations of the phase distribution of the 1-dimensional hologram 12 can be further simplified.

Figure 4:
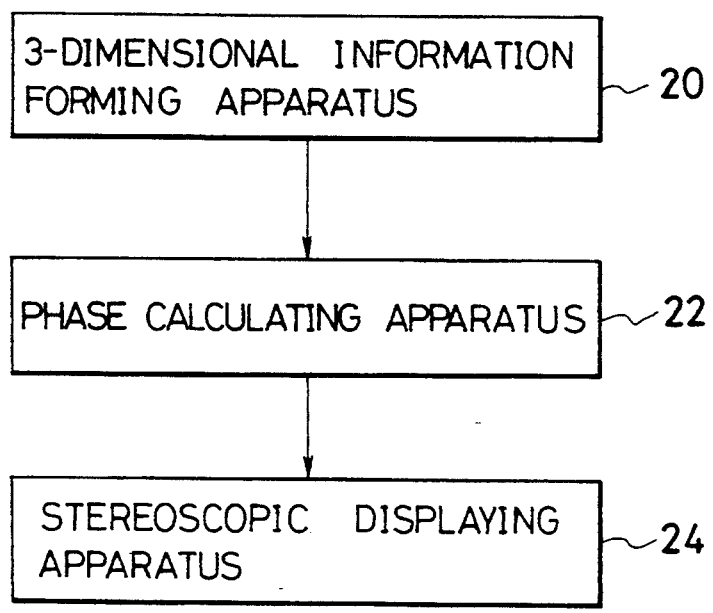
FIG. 4 is a system constructional diagram of the invention.

FIG. 4 is a system constructional diagram corresponding to a procedure for stereoscopic display. The system is constructed by a 3-dimensional information forming apparatus 20, a phase calculating apparatus 22, and a stereoscopic display apparatus 24. As a 3-dimensional information forming apparatus 20, for example, an apparatus such as a CAD system in which 3-dimensional structure data indicative of a target object has been held in a computer can be used. In the phase calculating apparatus 22, an algorithm according to a hologram information forming method of the invention, which will be explained hereinlater, can be realized by a software or a hardware. Further, the stereoscopic display apparatus 24 comprises: a liquid crystal display to express the 1-dimensional phase distribution obtained by the phase calculating apparatus 22; and a laser light source to irradiate a reference light for reproduction to the liquid crystal display.

Figure 5:
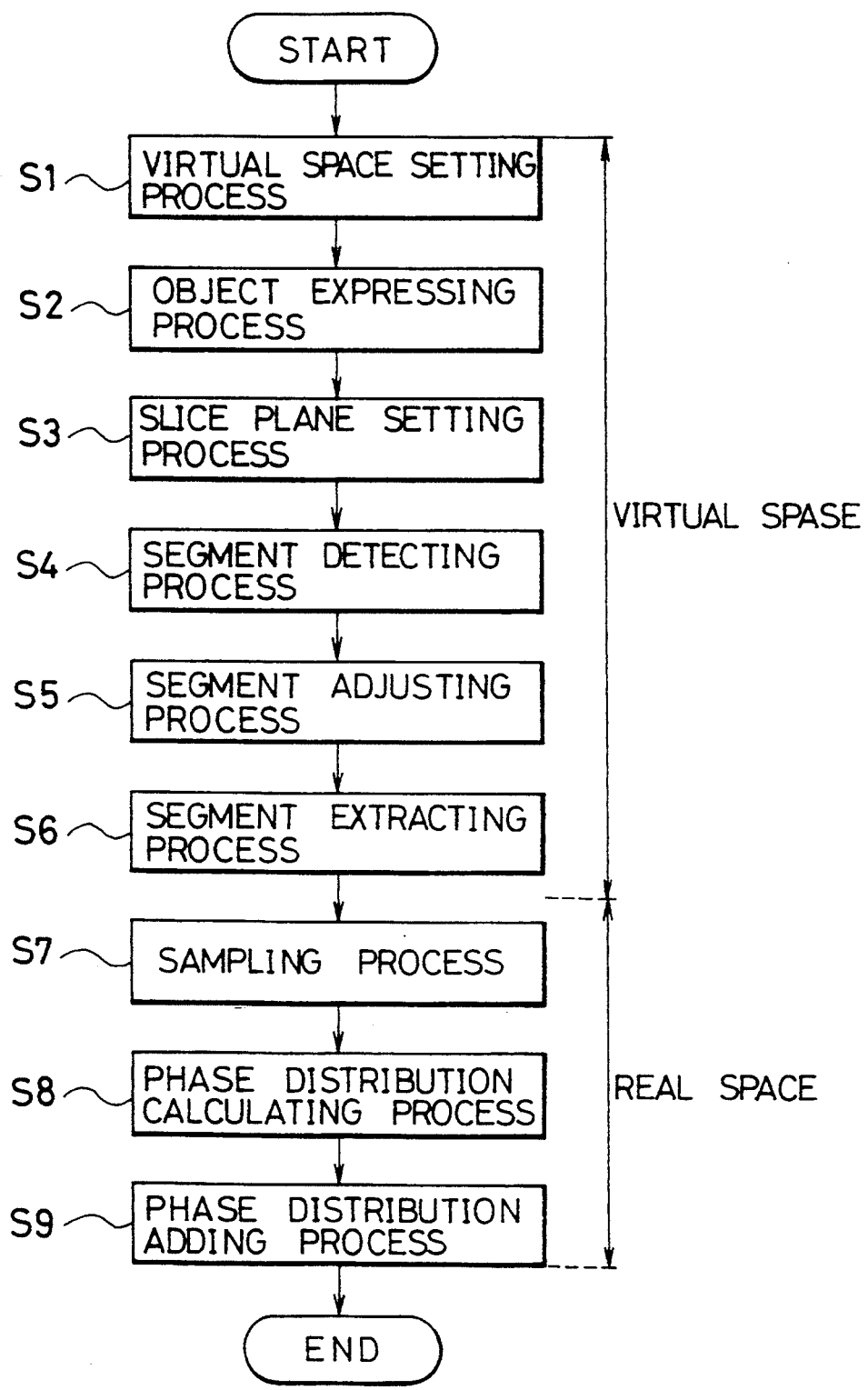
FIG. 5 is a flowchart showing a hologram information forming procedure of the invention.

A flowchart of FIG. 5 shows a fundamental processing procedure of the phase calculating process shown in step S1 in FIG. 2, namely, the hologram information forming method according to the invention. Step S1 relates to a virtual space setting process. A rectangular hologram surface to express a phase distribution, a rectangular visual field which can observe a solid image that is reconstructed by the phase distribution expressed on the hologram surface, and a boundary surface indicative of a limit region in the stereoscopic display are set. Step S2 relates to an object expressing process. The target object to be stereoscopically displayed by using the CAD system or the like is expressed as a polygon constructed by a set of micro triangular area elements. Step S3 relates to slice plane setting process. A plurality of slice planes are set a micro intervals in the vertical direction so as to be parallel with the horizontal plane of a virtual space. A crossing state with the polygon as a target object expressed in step S2 is produced by the slice planes. Step S4 relates to a line segment detecting process. The line segments which are obtained by the intersection between the set slice planes and the triangular area elements constructing the target object expressed as a polygon are detected. Step S5 relates to a line segments adjusting process. There is executed a line segment adjusting process such that the line segments indicative of the target object detected by the setting of the slice planes, the overlapped portion of the line segment indicative of the target object detected by the setting of the slice planes is clipped in accordance with the relation with the boundary plane indicative of the stereoscopic display limit set in the virtual space or such that the line segment is divided in order to simplify the processes with respect to the intersection of the line segment. In a line segment extracting process in step S6, the line segment which cannot be seen from the whole visual plane because it is obstructed by the line segments existing on this side is divided into a portion that is always seen from the whole visual field and a portion that is obstructed by another line segment and can be seen from only a part of the visual field, and the line segment is extracted.

By the processed such as detection, adjustment, and extraction of the line segment in steps S4 to S6, the line segment at each slice plane is classified into the line segment which can by seen from the whole visual field and the line segment which is obstructed by another line segment and can be seen from only a part of the visual field.

The processes in steps S1 to S6 mentioned above relate to the processes in the virtual space which has first been set. The virtual space here denotes a display apparatus to actually express a 1-dimensional phase distribution and a wavelength of reproduction light are not determined but a space is set with respect to the display and the wavelength of reproduction light which were virtually determined as a prerequisite. On the other hand, with respect to the processes in step S7 and subsequent steps, they are executed in a structure of a display as a stereoscopic display apparatus to actually express a 1-dimensional phase distribution, specifically speaking, in a real space based on the pixel pitch interval and the wavelength of reference light which is actually used.

In the sampling process in step S7, sampling points for phase calculation are set on the line segment extracted every slice plane. Coordinate values and luminances are given with respect to the sampling points. As for the luminance of the sampling point, a value based on a hidden surface process in the computer graphics technique is used. In a phase distribution calculating process in step S8, a phase distribution of a 1-dimensional hologram on the hologram surface is calculated for every sampling point. In the phase distribution adding process in last step S9, 1-dimensional hologram phase distributions calculated for the different sampling points are added to every slice plane. A 1-dimensional phase distribution in the stripe region in the horizontal direction of the hologram surface is finally obtained.

Figure 6:
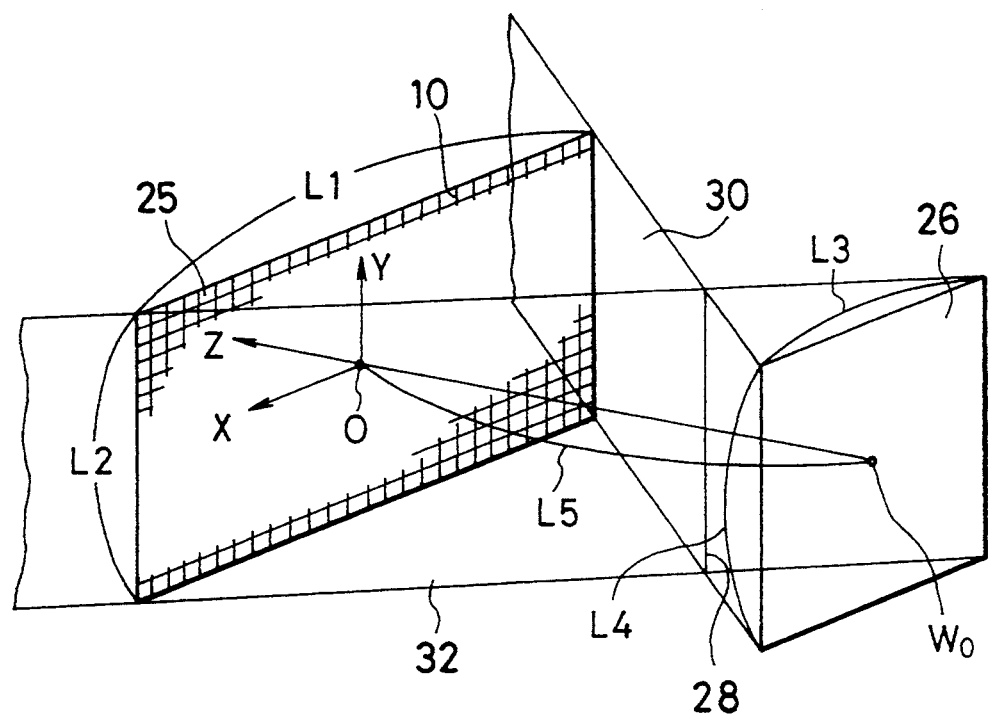
FIG. 6 is an explanatory diagram showing a setting state of a virtual space.

FIG. 6 visually shows a state of the virtual space setting process shown in step S1 in FIG. 5. The virtual hologram surface 10 and the virtual field 26 are set into the virtual space. It is now assumed that the hologram surface 10 has a structure such that micro pixels 25 which express the calculated phase values are 2-dimensionally arranged. Generally, about 1000 lp/mm is necessary as a resolution of the display that is needed for reconstruction of a hologram. Therefore, a size of pixel 25 is determined on the basis of such a resolution. A pitch interval of the pixels 25 provided on the virtual hologram surface 10 is set to $P_y$. For simplicity of explanation, it is now assumed that pitch intervals in the vertical and lateral directions of the pixel 25 are set to the same pitch interval $P_y$. The hologram surface 10 has a size of a lateral width $L_1$ and a height of $L_2$ on the basis of the presumption of the virtual display.

The visual field 26 is determined by a wavelength of reference light which is used in the wave front conversion by the phase distribution expressed on the hologram surface 10. It is now assumed that the wavelength of reference light in the virtual space is set to $\lambda_v$ and the reference light is irradiated perpendicularly to the hologram surface 10 for simplicity of explanation. Since the pitch interval of the pixels 25 of the virtual hologram surface 10 is equal to $P_y$, a spatial frequency f is obtained by $$f = \tfrac{1}{2} P_y \text{ [lp/mm]}$$

A maximum diffraction angle $\Phi$ due to the phase distribution has the following relational equation.

$$f = \sin\phi / \lambda_v$$

Figure 7:
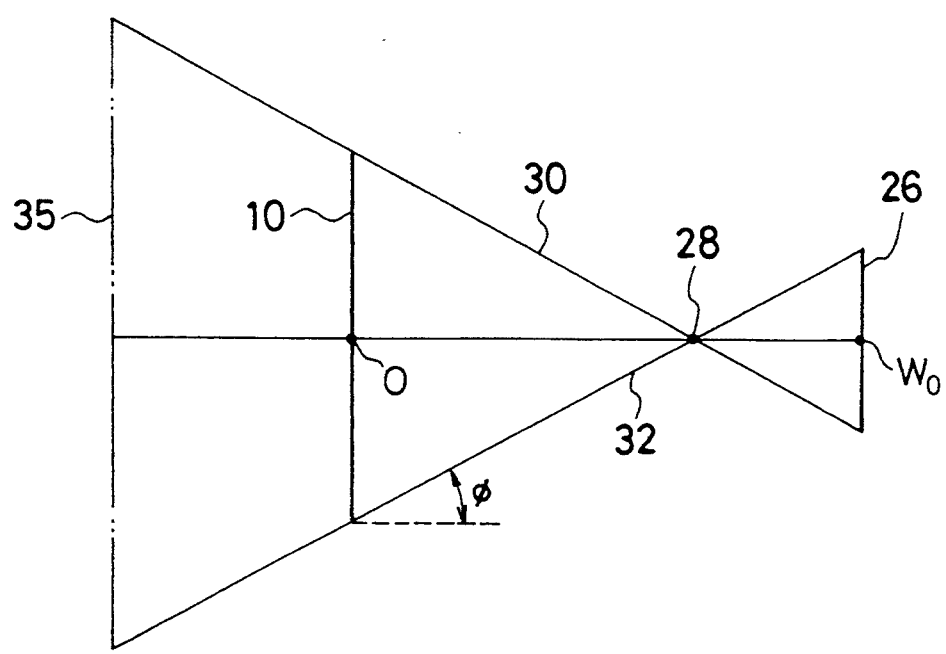
FIG. 7 is a plan view of FIG. 6.

As shown in a plan view of FIG. 7, therefore, when the diffraction angle $\Phi$ of the reference light which perpendicularly entered due to the 1-dimensional phase distribution expressed on the hologram surface 10 is set at both ends, boundary surfaces 30 and 32 can be set. Namely, although a solid image by the hologram 10 can be seen by setting the visual point to the inside of the boundary surfaces 30 and 32, a solid image cannot be seen when the visual point is set to the outside of the boundary surfaces 30 and 32. The boundary surfaces 30 and 32, accordingly, determine a region in which a solid image can be observed. A polygon expressed in the virtual space while setting a visual point $W_O$ into an origin is coordinate converted into the coordinate system of the origin O at the center of the hologram surface 10. After that, the line segment is extracted.

Figure 8:
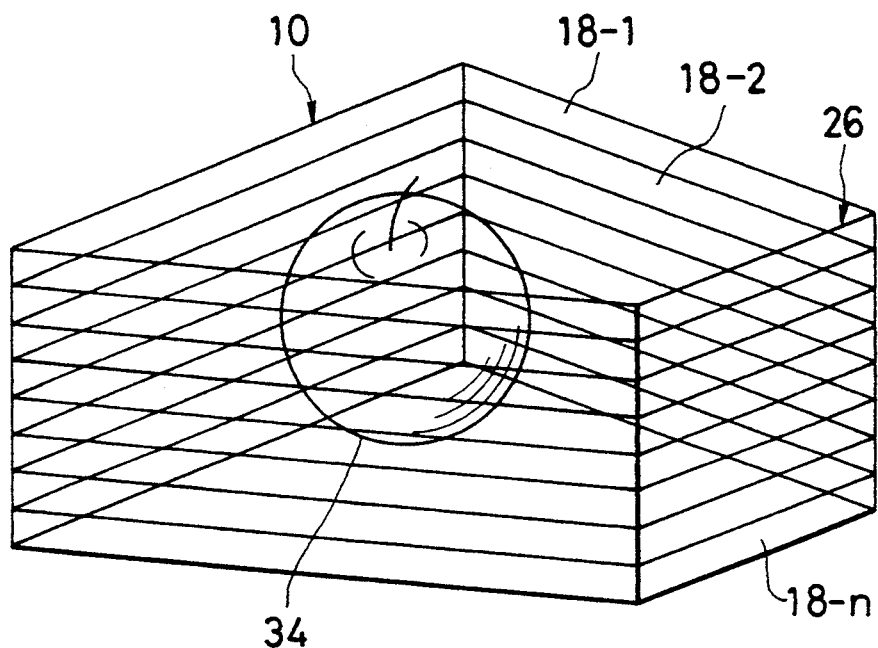
FIG. 8 is an explanatory diagram of a slicing state of a target object.
Figure 9:
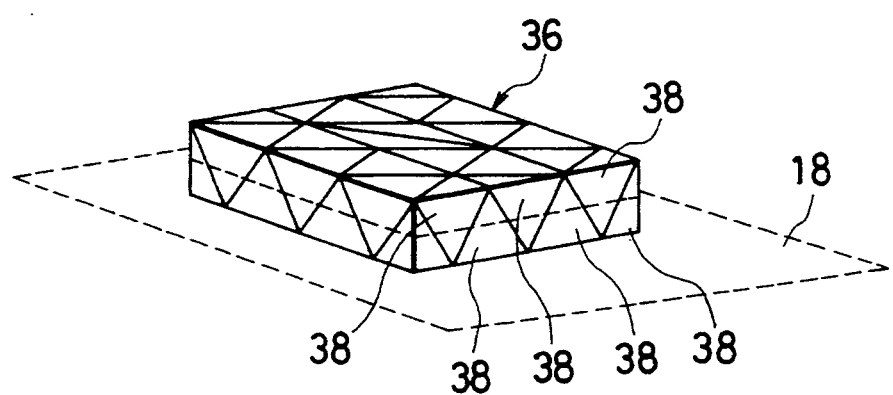
FIG. 9 is an explanatory diagram showing the intersection between the polygon expression of a target object and the slice plane.

FIG. 8 shows an object expression for a virtual space and a setting state of slice planes. A target object (polygon) 34 formed by 3-dimensional structure data by a CAD system or the like is expressed in the virtual space. For example, as shown in a box 36 in FIG. 9, the target object 34 is expressed as a set of triangular planes and sides. The expression format of the polygon by the set of triangular elements 38 is constructed by a coupling list of the coordinate values of three vertexes of each plane element and the vertexes of the other plane elements. As shown in FIG. 8, for the target object 34 set in the virtual space, slice planes 18-1, 18-2, - - -, 18-n are set in parallel with the horizontal plane. An interval among the slice planes 18-1 to 18-n is set to the pitch interval Pv of the pixels 25 of the hologram surface 10. To reduce the calculation amount by decreasing the resolution, the slice planes 18-1 to 18-n can be also set at an interval which is equal to or larger than the pitch interval $P_v$ of the pixels 25. By setting the slice planes 18-1 to 18-n for the target object 34 as mentioned above, an intersecting state of the slice plane for the triangular plane elements which express the target object 34 is such that a crossing line of each plane element 38 and the slice plane 18 constructs one line segment as will be obviously understood from FIG. 9. When the crossing line segment of the target object and the slice plane is obtained as mentioned above, the line segment is defined by the coordinate values of two end points.

Figures 10, 11A, 11B:
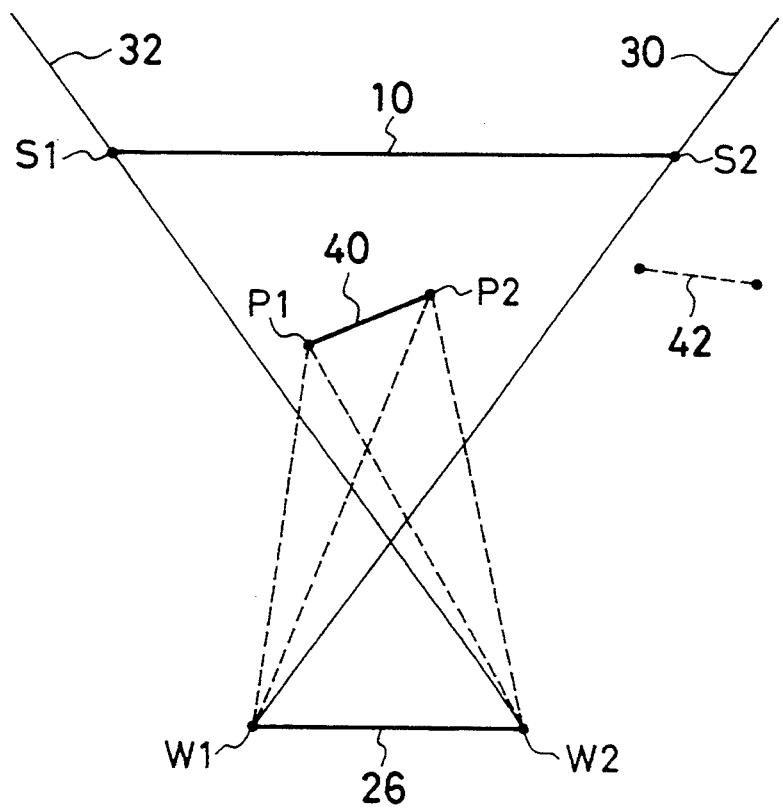
FIG. 10 is an explanatory diagram of line segments which are seen in a whole visual field.
FIGS. 11A and 11B are explanatory diagrams of a data format of line segments which are seen in the whole visual field.

The line segment adjusting process and the line segment extracting process in steps $5 and $6 in FIG. 5 will now be practically explained. FIG. 10 shows a state in which a line segment 40 which is seen from the whole visual field 26 with respect to a certain slice plane exists. End points of the visual field 26 are shown by $W_1$ and $W_2$. End points of the hologram surface 10 are shown by $S_1$ and $S_2$. The line segment 40 expressed by the coordinate values of the end points $P_1$ and $P_2$ exists in the region on the inside of the boundary surfaces 32 and 30. In the invention, the line segment existing on the inside of the boundary surfaces 32 and 30 as shown in the line segment 40 is extracted as a target line segment of the phase calculation. On the other hand, a line segment 42 existing on the outside of the boundary surface 30 is deleted because it is not a target for calculation.

FIGS. 11A and 11B show a data format of the line segment 40 which can be seen from the whole region of the visual field 26 in FIG. 10. That is, FIG. 11A shows the content of the data format. The coordinate values of the left and right end points of the line segment are stored subsequent to the line segment number. Although the line segment has been divided at the right end point and the left end point, it is also possible to define this side as a start point and the depth side as an end point when they are seen in the depth direction. Subsequently, the coordinate values of the left end point and right end point of the visual field are stored. With respect to the line segment 40 in FIG. 10, data in which the line segment number # the left end point $P_1$ of the line segment, the right end point $P_2$ of the line segment, the left end point $W_1$ of the visual field, and the right end point $W_2$ of the visual field have been stored as shown in FIG. 11B and which indicates the line segment 40 that is seen from the whole region of the visual field is formed in accordance with the data format as mentioned above. By using such a data format of the line segment, a calculating region of the 1-dimensional phase distribution at the hologram surface 10 in the phase calculation can be further simplified.

Figure 12:
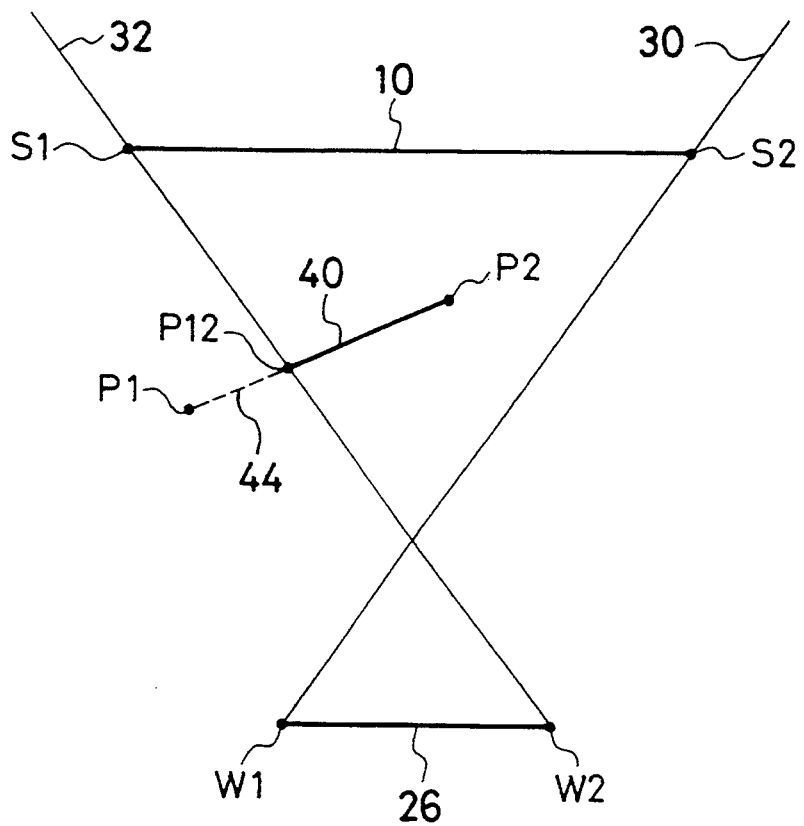
FIG. 12 is an explanatory diagram for clipping the line segment exceeding the limit on one side.

FIG. 12 shows a clipping process of a line segment. As for the line segment having the end points $P_1$ and $P_2$, since the end point $P_1$ exists on the outside of the boundary surface 32, a line segment 44 existing on the outside of a crossing point $P_{12}$ with the boundary surface 32 is deleted, thereby forming a new line segment 40 having the crossing point $P_{12}$ and the end point $P_2$ on the right side. Since the line segment 40 which was clipped as mentioned above can be seen from the whole region of the visual field 26, it has the same data format as that shown in FIGS. 11A and 11B.

Figure 13:
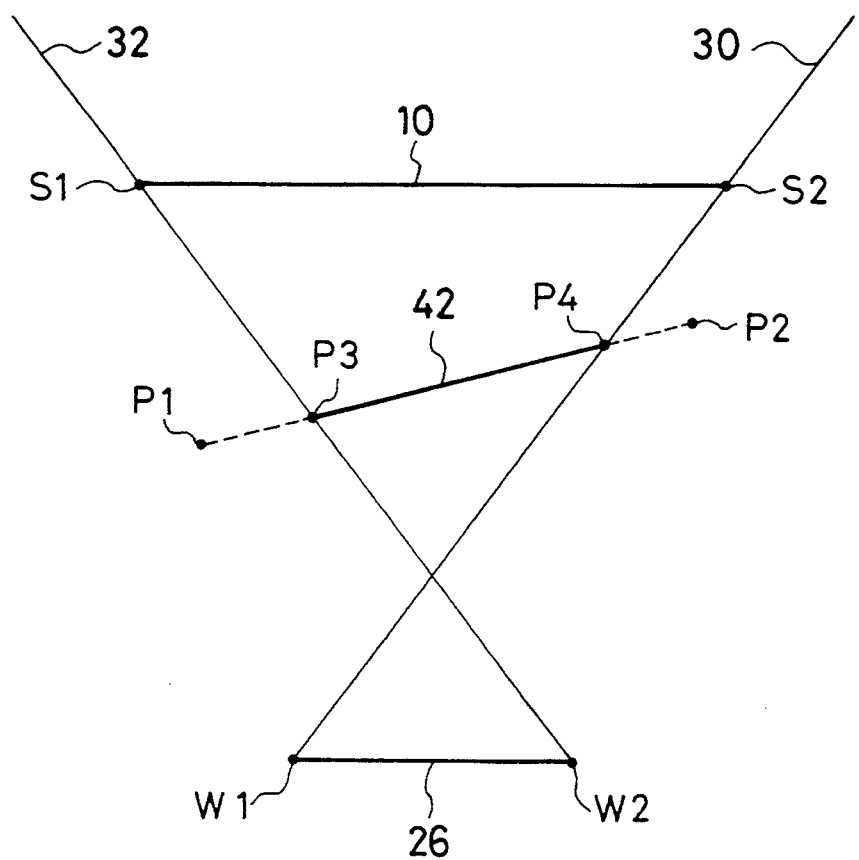
FIG. 13 is an explanatory diagram for clipping the line segment exceeding the limits on both sides.

FIG. 13 shows another example of the clipping process of a line segment. In this case, the line segment 42 having the end points $P_1$ and $P_2$ passes through both of the boundary surfaces 32 and 30 and exist. Therefore, crossing points $P_3$ and $P_4$ with the boundary surfaces 30 and 32 are obtained and are set to the end points of a new line segment and the line segment existing on the outside is deleted.

Figures 14, 15A, 15B:
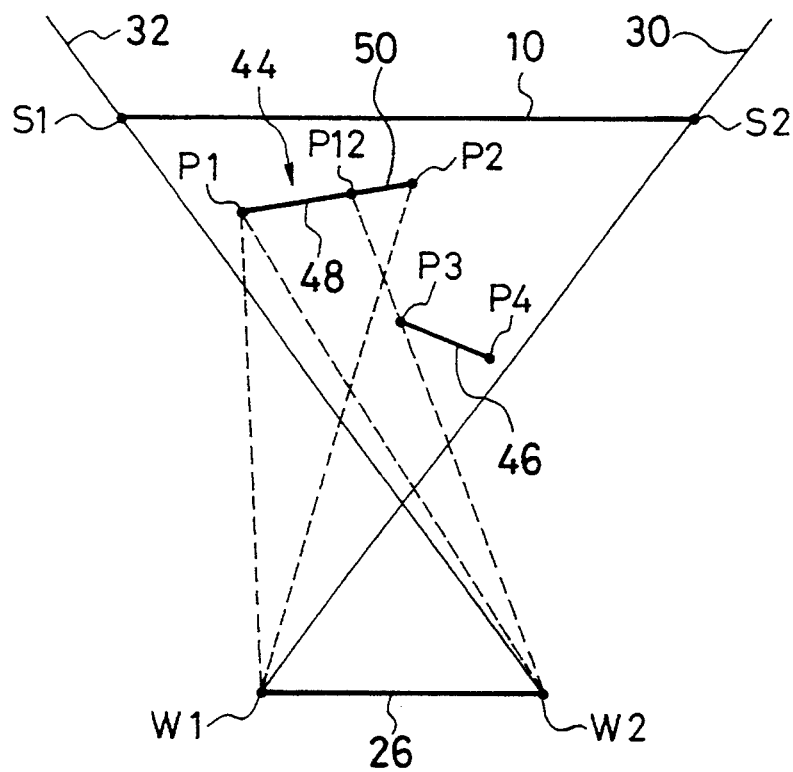
FIG. 14 is an explanatory diagram of the line segment a part of which cannot be seen on the right side of the visual field.
FIGS. 15A and 15B are explanatory diagrams of a data format of the line segment a part of which cannot be seen on the right side of the visual field.

FIG. 14 shows a line segment a part of which cannot be seen on the right side of the visual field 26. Another line segment 46 having end points $P_3$ and $P_4$ is located in front of the line segment 44 having the end points $P_1$ and $P_2$. First, when the line segment 44 is seen from the end point $W_1$ of the visual field 26, the whole region in a range from the end point $P_1$ to the end point $P_2$ can be seen. On the other hand, when the line segment 44 is seen from the end point $W_2$ on the right side of the visual field 26, the right side from the point $P_{12}$ which passes through the end point $P_3$ of the line segment 46 and intersects the line segment 44 cannot be seen from the end point $W_2$. That is, although the portion of the line segment 44 in a range from the end point $P_1$ to the crossing point $P_2$ can be seen from the whole region of the visual field 26, the portion in a range from the crossing point $P_{12}$ to the end point $P_2$ cannot be seen in the whole region of the visual field 26. Therefore, the portion to the crossing point $P_{12}$ is a limit range which can be seen in the whole visual field 26. Further, with respect to the right side, the visual field 26 in which the line segment can be seen is limited so as to be gradually narrowed toward the left side including the end point $W_1$. In such a case, the line segment 44 is divided into a line segment 48 having end points $P_1$ and $P_{12}$ which can be seen from the whole region of the visual field and a line segment 50 having end points $P_{12}$ and $P_2$ which cannot be seen in a part of the visual field, and they are extracted. The line segment 48 which can be seen from the whole region of the visual field has a data format as shown in FIGS. 11A and 11B. On the other hand, the line segment 50 a part of which cannot be seen on the right side of the visual field has a data format as shown in FIGS. 15A and 15B.

FIG. 15A shows the content of a data format of the line segment a part of which cannot be seen on the right side of the visual field. The line segment number, the left end point of the line segment, the right end point of the line segment, the left end point of the visual field, and the end point of the obstruction line segment are stored in the data format. In case of the line segment 50 in FIG. 14, as shown in FIG. 15B, the line segment number #002, the left end point $P_{12}$ of the line segment, the right end point $P_2$ of the line segment, the left end point $W_1$ of the visual field, and the end point $P_3$ of the obstruction line segment 46 are stored. The data format in FIGS. 15A and 15B differs from the data format of the line segment which can be seen in the whole region of the visual field as shown in FIGS. 11A and 11B with respect to a point that the end point of the obstruction line segment is stored in place of one of the end points of the visual field.

Figures 16, 17A, 17B:
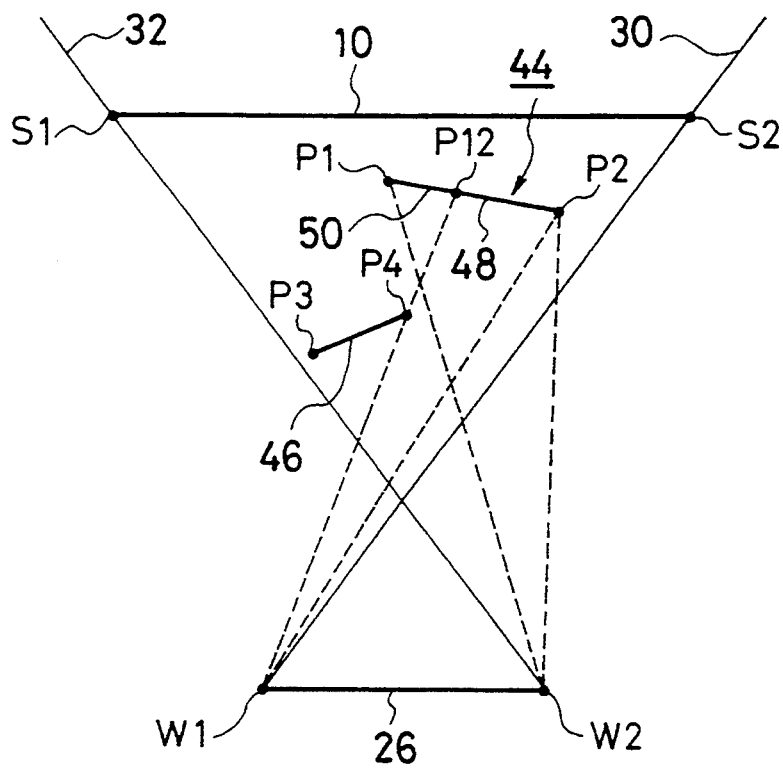
FIG. 16 is an explanatory diagram of the line segment a part of which cannot be seen on the left side of the visual field.
FIGS. 17A and 17B are explanatory diagrams of a data format of the line segment a part of which cannot be seen on the left side of the visual field.

FIG. 16 shows a line segment a part of which cannot be seen on the left side of the visual field in contrast with FIG. 14. A part of the line segment 44 having the end points $P_1$ and $P_2$ cannot be seen on the right side of the visual field 26 by the line segment 46 having the end points $P_3$ and $P_4$ existing in front of the line segment 44. That is, when the line segment is seen from the end point $W_1$ on the left side of the visual field 26, the portion to the crossing point $P_{12}$ with the eyesight line which passes through the end point $P_4$ of the another line segment 46 can be seen in the whole region of the visual field 26. However, the portion on the left side of the crossing point $P_{12}$ cannot be seen on the left side of the visual field 26 as it approaches the side of the end point $P_1$ side. In this case as well, therefore, the line segment 44 is divided into the line segment 48 having the end points $P_{12}$ and $P_2$ which can be seen in the whole region of the visual field 26 and the line segment 50 having the end points $P_1$ and $P_{12}$ a part of which cannot be seen on the left side of the visual field 26. The line segment 50 a part of which cannot be seen on the left side of the visual field 26 has a data format in which the line segment number #003, the left end point $P_1$ of the line segment, the right end point $P_{12}$ of the line segment, the end point $P_4$ of the obstruction line segment, and the right end point $W_2$ of the visual field are stored as shown in FIGS. 17A and 17B.

Figure 18:
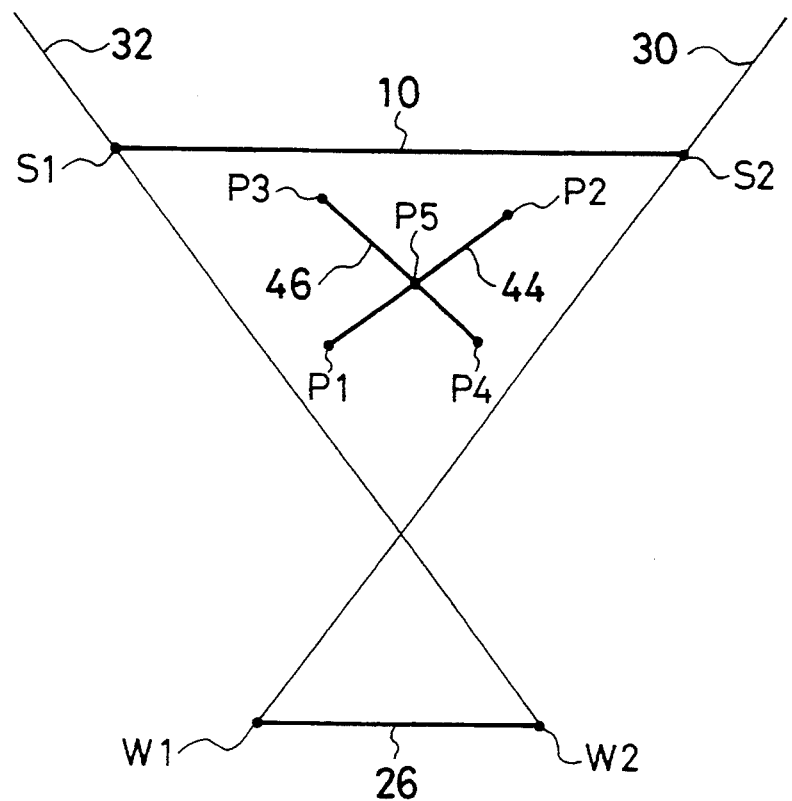
FIG. 18 is an explanatory diagram in case of dividing the line segments which cross.

FIG. 18 shows a dividing process of an intersecting line segment. In the case where the line segment 44 having the end points $P_1$ and $P_2$ intersects the line segment 46 having the end points $P_3$ and $P_4$ at a crossing point $P_5$ as shown in the diagram, the line segments are divided into four line segments by the crossing point $P_5$. Since the divided line segment having the end points $P_1$ and $P_5$ and the divided line segment having the end points $P_4$ and $P_5$ can be seen from the whole region of the visual field 26, data according to the data format shown in FIGS. 11A and 11B is produced. The line segment having the end points $P_5$ and $P_3$ and the line segment having the end points $P_5$ and $P_2$ are deleted because they are hidden by the two line segments on this side and cannot be seen at all from the visual field 26.

By the line segment adjusting and extracting processes as mentioned above, the following two kinds of line segments are obtained as targets of the phase calculation.

I. Line segment which can be perfectly seen from the visual field

II. Line segment which cannot be seen at all from the visual field

With respect to the line segments obtained as mentioned above, the line segment data is sorted so as to be arranged in accordance with the order of the positions in the depth direction every slice plane.

A calculating process of a 1-dimensional phase distribution of the hologram surface based on the line segments obtained every slice plane will now be described. The principle of a hologram will be first explained. One laser beam is divided into two beams and one of the laser beams is irradiated to an object, so that a laser beam (object light) is scattered by the object. A hologram is obtained by an interference of two light beams of the laser beams (object light) and another laser beam (reference light). When a wave front of the reference light assumes $R \cdot \exp(j\Phi_r)$ and a wave front of the object light assumes $O \cdot \exp(j\Phi_o)$, an exposing intensity $I_H$ of the hologram is $$I_H = R^2 + O^2 + 2 \cdot R \cdot O \cdot \cos(\Phi_o - \Phi_r) \ldots \quad (1)$$

In case of developing the hologram, changes in amplitude and phase which are proportional to the exposing intensity $I_H$ of the equation (1) occur in the hologram. To electrically form a hologram, it is sufficient to use a space light modulating device such as a liquid crystal device or the like which can change the amplitude or phase of the light. By irradiating the same wave front as that of the reference light to the hologram formed as mentioned above, a hologram can be reconstructed. Since only the third term of the right side in the equation (1) contributes to the reproduction of the object light in the exposing intensity $I_H$ of the equation (1), when considering the third term of the right side, a transmission light T from the hologram is $$\begin{aligned} T &= I_H \cdot R \cdot \exp(j\phi_r) \\ &\propto 2 \cdot R \cdot O \cdot \cos(\phi_o - \phi_r) \cdot \exp(j\phi_r) \\ &= O \cdot \exp(j\phi_r) + O \cdot \exp\{-j(\phi_o - 2 \cdot \phi_r)\} \end{aligned} \quad (2)$$

The first term of the right side in the equation (2) shows that the wave front from the object was reproduced. The second term of the right side indicates a conjugate wave of the object light. From the above description of the principle, it will be understood that it is sufficient to calculate only the third term of the right side of the equation (1) in the calculation of the phase distribution of the hologram.

Figure 19:
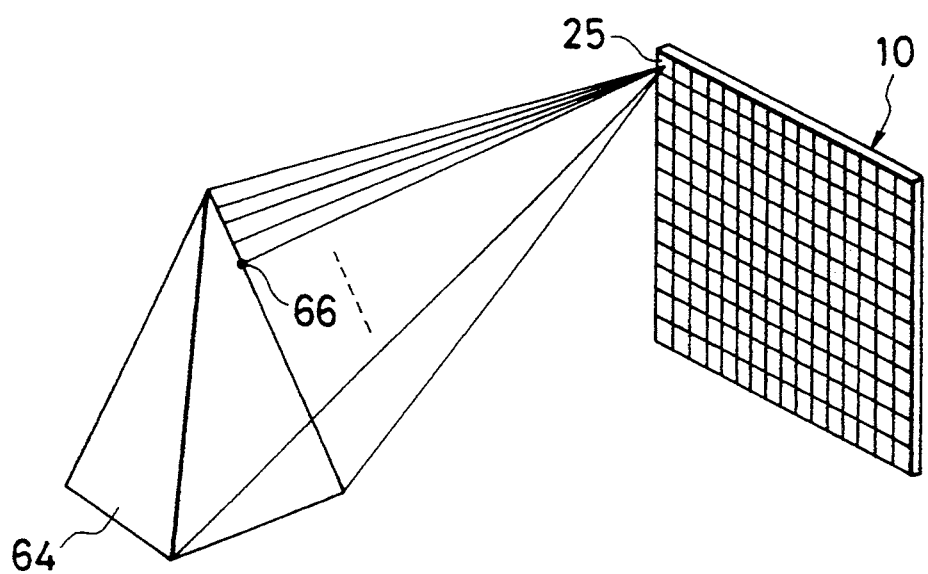
FIG. 19 is an explanatory diagram of the calculating principle of a phase distribution of a hologram.

FIG. 19 shows the principle of the calculation of a hologram. Now, regarding that the reference light is constructed by a plane wave, since an intensity of plane wave doesn't change in dependence on the location, the light intensity R can be ignored and it is possible to handle such that the phase $\Phi_r = 0$. When a luminance (scattering degree) of a certain sampling point 66 having coordinates $(X_i, Y_i, Z_i)$ of the object 64 assumes $I_i$, the exposing intensity $I_H$ of the pixel 25 on the hologram surface 10 is $$I_H = \sum_i \{(I_i/r) \cdot \cos(k \cdot r)\} \quad (3)$$

where, k denotes the number of waves of the laser beam $$r = \sqrt{\{(X_i - X_{hi})^2 + (Y_i - Y_{hi})^2 + Z_i^2\}} \quad (4)$$

Figure 20:
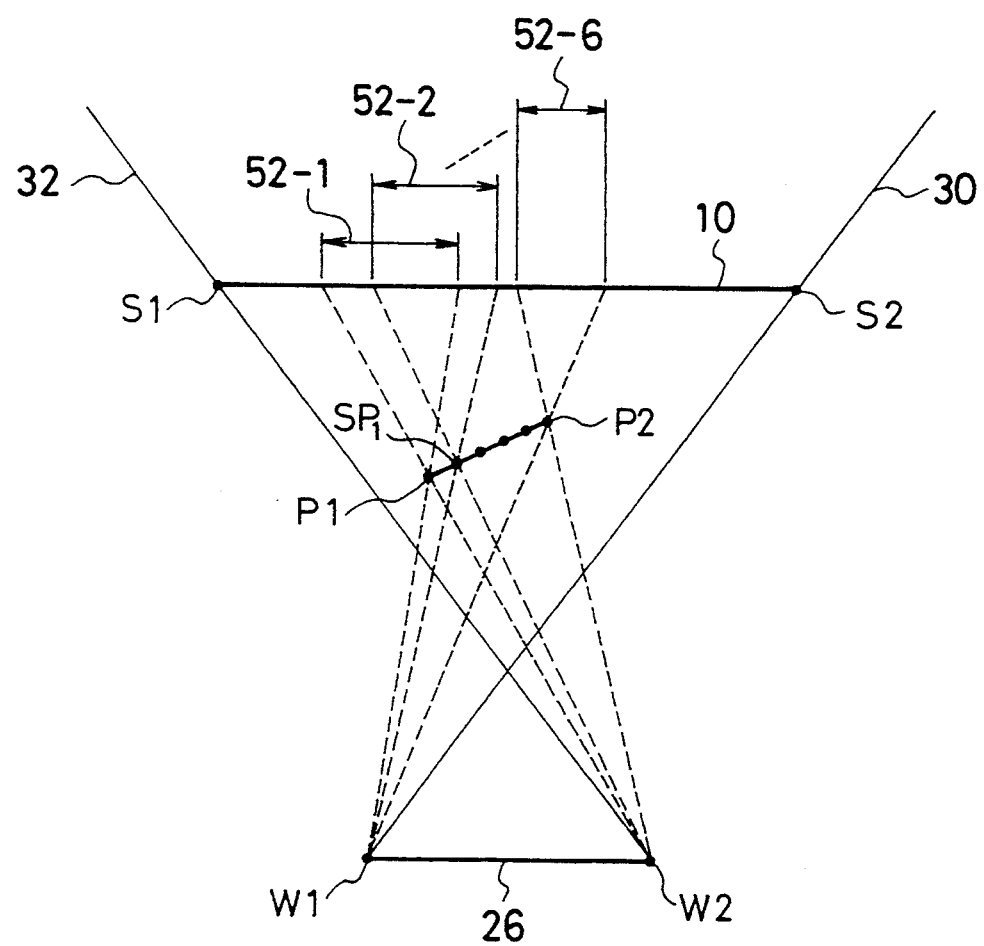
FIG. 20 is an explanatory diagram of a phase calculating region of the line segment which can be seen in the whole visual field.

FIG. 20 shows a calculating region of a 1-dimensional phase distribution with respect to a line segment which can be seen from the whole region of a visual field. Since the line segment which can be seen in the whole region of the visual field is expressed by the data format shown in FIGS. 11A and 11B, the end points $P_1$ and $P_2$ of the line segment and the end points $W_1$ and $W_2$ of the visual field 26 can be set into the virtual space for the hologram surface 10 as shown in the diagram. First, in the invention, sampling points SP are set onto the line segment having the end points $P_1$ and $P_2$. It is necessary that a division length of the line segment to decide the sampling points is set to a small enough value in order to allow a continuous state of a plurality of line segments to be seen as one line. Theoretically speaking, a division length of the line segment to set the sampling points is visually set to a value of about 50 μm. For simplicity of explanation, sampling points $SP_1$, $SP_2$, - - - are set every pitch interval $P_v$ by using the pitch interval $P_v$ of the pixels of the hologram surface 10 provided in the virtual space. A calculating region of the phase distribution on the hologram surface 10 at the end point $P_1$ is set to a calculating region 52-1 which is given by the interval of the crossing points on the hologram surface 10 of the eyesight lines from the end points $W_1$ and $W_2$ of the visual field 26. With respect to the next sampling point $SP_1$, a calculating region is also similarly set to a region 52-2 between the crossing points at which the eyesight lines from the end points $W_1$ and $W_2$ on both sides of the visual field 26 intersect the hologram surface 10. In a manner similar to the above, calculating regions are obtained with respect to the other remaining sampling points and the end point $P_2$ on the right side. A calculating region 52-6 is determined with respect to the end point $P_2$.

When the calculating regions 52-1 to 52-6 are determined with respect to the sampling points SP between the end points $P_1$ and $P_2$ as mentioned above, by giving a luminance at each point, a phase distribution can be calculated in accordance with the equations (3) and (4). In this case, since the phase distribution about the sampling points on the same slice plane is calculated, the Y coordinate value of the equation (4) is equal to 0 and the 2-dimensional coordinates using the coordinate values on the XZ plane (slice plane) are used, the calculations themselves are simplified.

Figure 21:
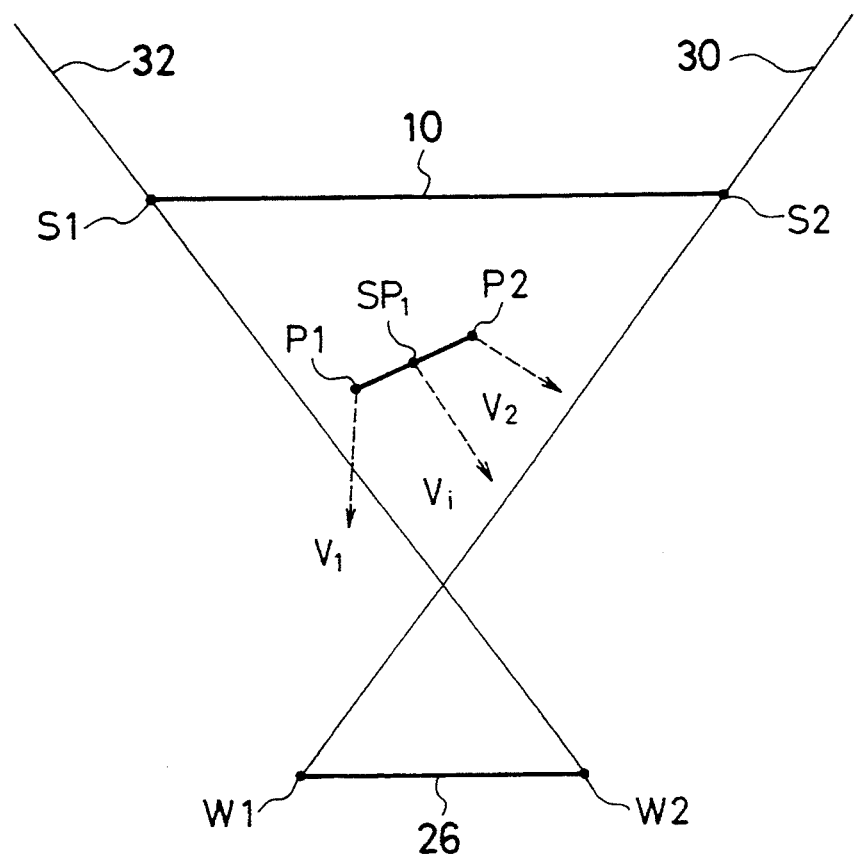
FIG. 21 is an explanatory diagram showing the setting of luminance information of sampling points set between the end points.

In the phase calculation at each sampling point shown in FIG. 20, since the phase distribution is calculated on the basis of the luminance at each sampling point including the end points $P_1$ and $P_2$, it is necessary to previously obtain the luminances prior to the phase calculation. Such a calculation of the luminance at the sampling point can be realized by applying various kinds of shading models in the computer graphics. In the luminance calculation based on the shading technique of the computer graphics, for example, as shown in FIG. 21, geometrical normal lines of the plane to display the end points $P_1$ and $P_2$ of the line segment are previously obtained as shown by broken lines as shown in FIG. 21. The normal lines now assume eyesight line vectors $V_1$ and $V_2$. With respect to an arbitrary sampling $SP_i$ set between the points $P_1$ and $P_2$, an eyesight line vector $V_i$ is obtained by a linear interpolation from the eyesight line vectors $V_1$ and $V_2$ at both end points $P_1$ and $P_2$. The normal lines of the end points $P_1$ and $P_2$ have different directions because they are obtained by the average with the normal lines of the adjacent plane. On the other hand, with respect to the plane elements of the polygon in which the line segment having the end points $P_1$ and $P_2$ was extracted, for example, a diffusion coefficient, a reflection coefficient, light source information, and the like are provided as various kinds of attribute information in a manner similar to the case of the display in the computer graphics. It is, therefore, sufficient to calculate the luminance at the sampling point $SP_i$ on the basis of the attribute information and the eyesight line vector $V_i$. The calculation of the luminance is not limited to the smooth shading model of the computer graphics but a proper hidden plane processing technique can be applied.

Figure 22:
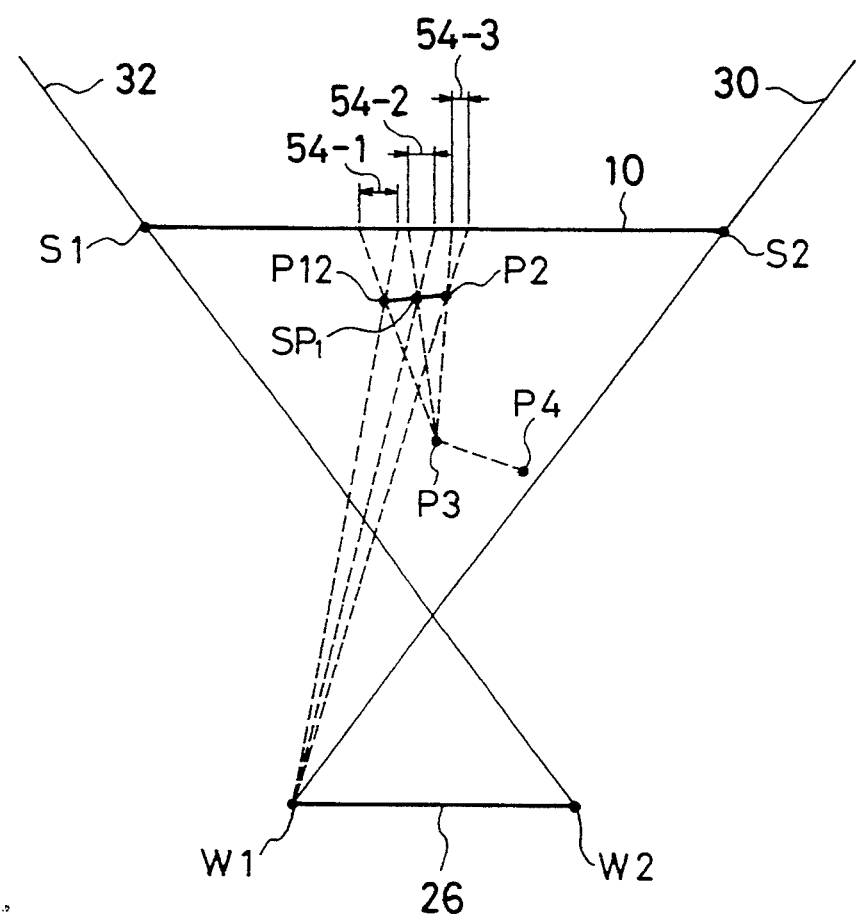
FIG. 22 is an explanatory diagram of a phase calculating region of the line segment which cannot be seen in a part of the visual field.

FIG. 22 shows the phase calculation of a line segment which cannot be seen in a part of the visual field. The end points $P_{12}$ and $P_2$ of the line segment, the left end point $W_1$ of the visual field, and the end point $P_3$ of the obstruction line segment are set to the hologram surface 10 on the basis of the line segment data in FIG. 15B. In this instance, although there is no need to consider the right end point $W_2$ of the visual field 26 and the boundary surfaces 30 and 32, they are shown to easily understand the explanation. The line segment having the end points $P_{12}$ and $P_{02}$ is divided by, for example, a division length of the pixel pitch interval $P_v$ of the virtual hologram surface 10 and the sampling point $SP_1$ is provided. A region of the phase calculation on the hologram surface 10 based on the light from the point $P_{12}$ is set to a region 54-1 between the left end point $W_1$ of the visual field 26 and the crossing point on the hologram surface 10 of the eyesight line which starts from the end point $P_3$ of the obstruction line and passes through the point $P_{12}$. With respect to the sampling point $SP_1$ and the end point $P_2$ as well, calculating regions 54-2 and 54-3 are similarly obtained. When the calculating regions 54-1, 54-2, and 54-3 are obtained, the luminance at the points $P_{12}$, $SP_1$, and $P_2$ are obtained in a manner similar to the case of FIG. 21. A phase distribution is calculated for every pixel included in the calculating regions 54-1 to 54-3 in accordance with the equations (3) and (4). When the phase calculations are calculated with regard to the sampling points including the end points of all of the line segments obtained with regard to one slice plane, the results of the calculations are added in the 1-dimensional region of the hologram surface 10, so that the 1-dimensional phase distribution corresponding to a certain stripe plane can be finally obtained. The above processes are executed with respect to the line segments of all of the slice planes.

Although the phase calculations shown in FIGS. 20 to 22 have been performed with respect to the virtual spaces shown in FIGS. 6 to 7 as examples, in the actual processes, a phase distribution in a real space in which the display to actually express the phase distribution at the stage of the phase calculation and the wavelength of the reproduction light were specified is calculated. When it is now assumed that a pixel pitch of the hologram surface 10 in the real space, namely, a liquid crystal display or the like to actually express the phase distribution is set to $P_r$ and a wavelength of reproduction light is set to $\lambda_r$, a wavelength $\lambda_v$ in the virtual space that is used in the calculation of the phase distribution in the equations (3) and (4) is obtained by $\lambda_v = \lambda_r \bullet (P_v/P_r)$ . . . (5)

$\lambda_v$: wavelength of light in the virtual space
$\lambda_r$: wavelength of light in the real space
$P_v$: pitch interval of pixels in the virtual space
$P_r$: pitch interval of pixels in the real space
The number of waves ($k_v$) which are used in the virtual space is obtained by $k_v = k_r \bullet (P_r/P_v)$ . . . (6)

$k_v$: the number of waves in the virtual space
$k_r$: the number of waves in the real space
and is calculated as a 1-dimensional phase distribution in the real space. That is, the conversion from the virtual space into the real space can be realized by calculating the phase distribution by using the wavelength and the number of waves according to a magnification setting which is determined by a ratio of the pixel pitch interval P in the real space and the pixel pitch interval $P_v$ in the virtual space.

By executing the processes up to the detection of the line segments in the virtual space, information of the target object which was converted into the line segments can be obtained without being limited by the performance of the liquid crystal display which is used in the actual stereoscopic display or the wavelength of reference light. The device to actually express the phase distribution and the wavelength of reference light are subsequently obtained. After that, the phase distribution in the real space is simply calculated.

Figure 23:
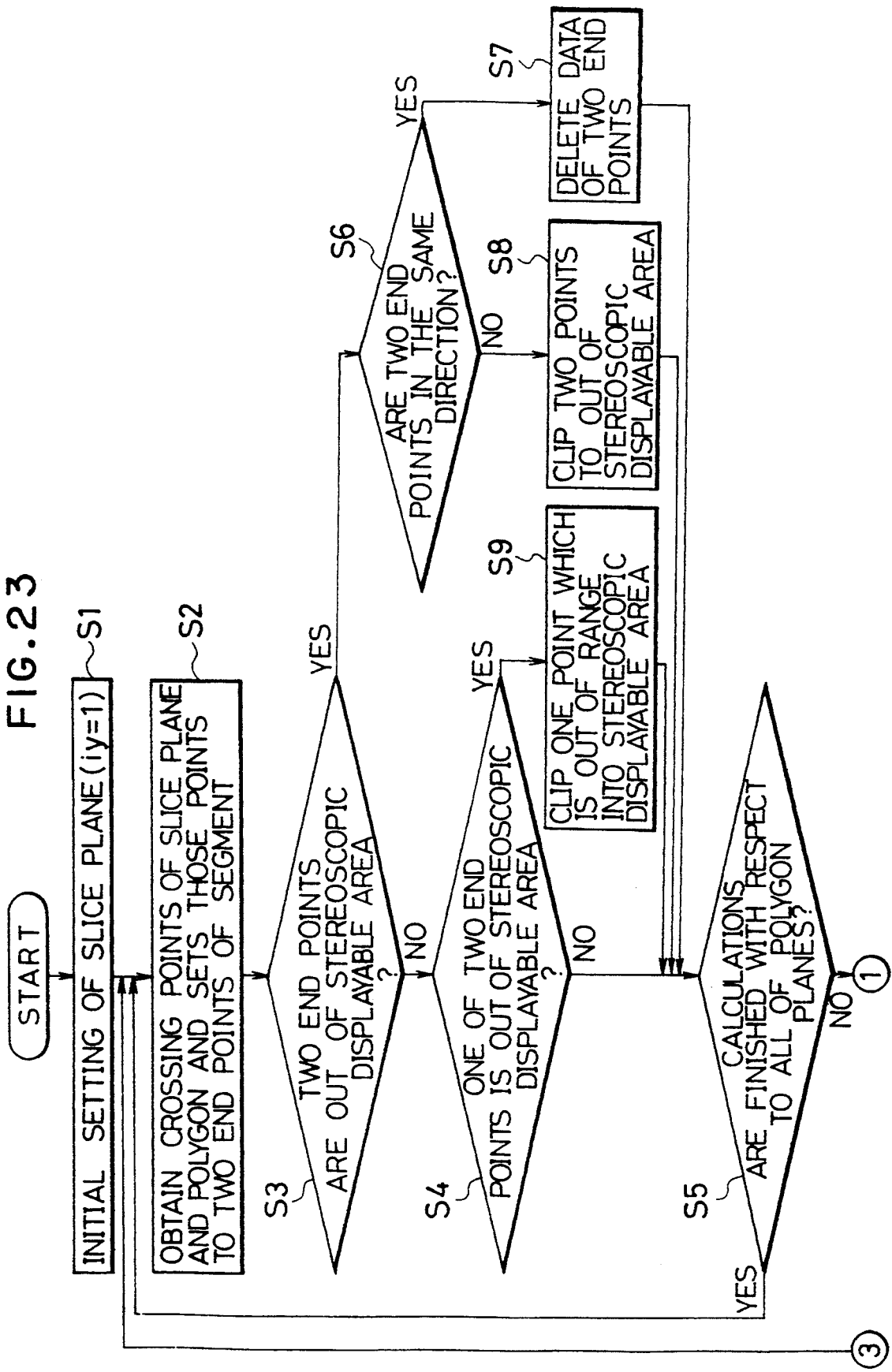
FIG. 23 is a flowchart showing the details of the formation of hologram information according to the invention.
Figure 24:
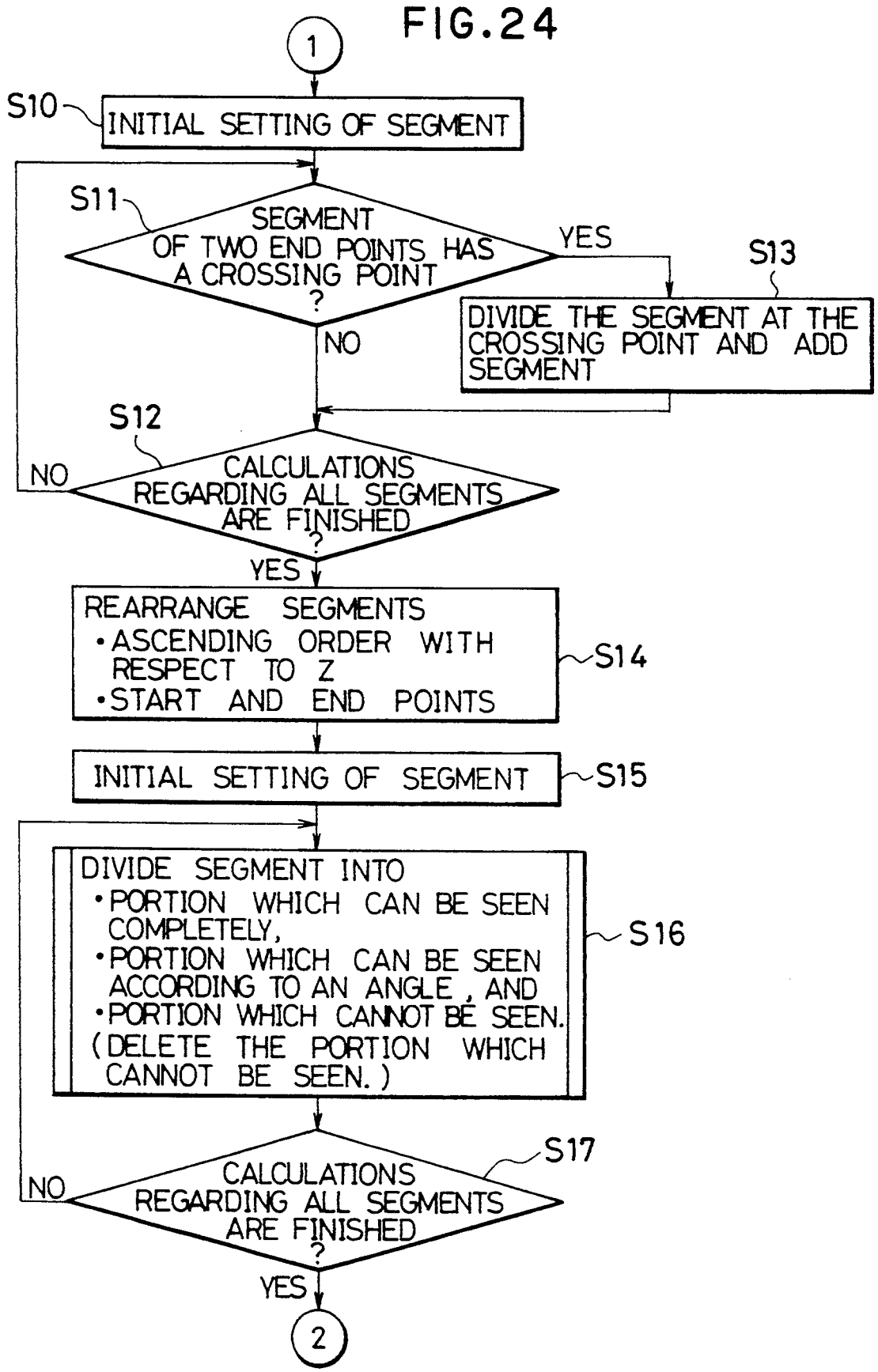
FIG. 24 is a flowchart showing the details of the formation of hologram information according to the invention.
Figure 25:
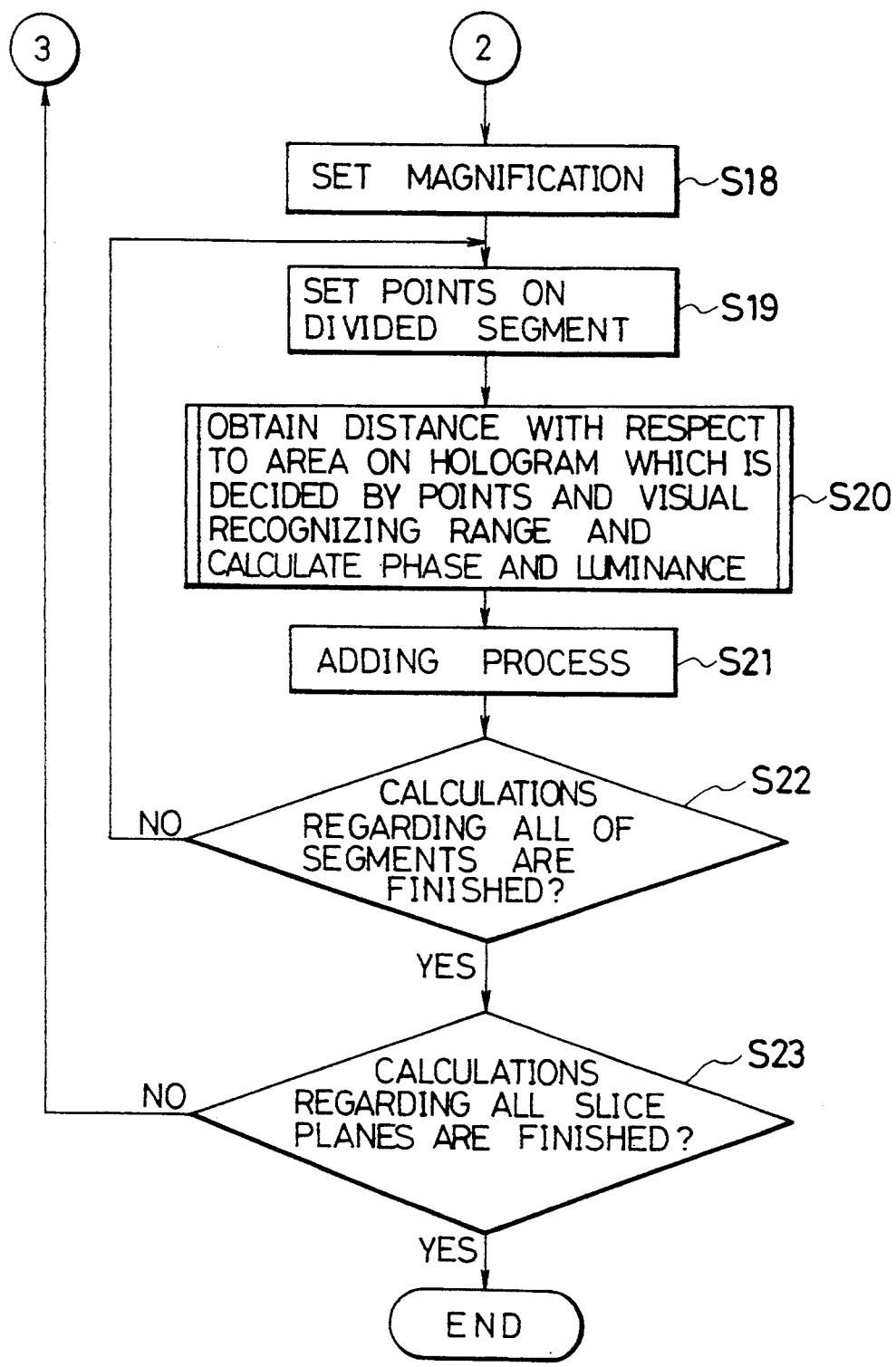
FIG. 25 is a flowchart showing the details of the formation of hologram information according to the invention.

FIGS. 23 to 25 show flowcharts for realizing the processes in step S3 and subsequent steps to form hologram information according to the invention shown in FIG. 5 by a software. In FIG. 23, a slice plane is initialized in step S1. Subsequently, in step S2, crossing points of the set slice plane and the polygon expressed as a target object are obtained and set to two end points of the line segment. In step S3, a check is made to see if the two end points of the line segment lie within a region in which the stereoscopic display can be performed or not. If NO, a check is made in step S4 to see if one of the two end points is out of the stereoscopic displayable region or not. When both of the two end points are within the stereoscopic displayable region, the processing routine advances to step S5 and a check is made to see if the calculations to extract the line segments have been finished with respect to all of the plane elements of the polygon or not. When the two end points of the line segment are out of the stereoscopic displayable region in step S3, the processing routine advances to step S6 and a check is made to see if the two end points exist in the same direction on either the right side or the left side when they are seen from the visual field or not. When the two end points of the line segment exist in the same direction, namely, on the right side or the left side of the stereoscopic displayable region, specifically speaking, in the case as shown by the line segment 42 in FIG. 10, step S7 follows and the data of two end points is deleted. When the two end points of the line segment exist in different directions in step S6, namely, when they are in the states of the points $P_1$ and $P_2$ in FIG. 13, step S8 follows and both of the two end points are clipped into the stereoscopic displayable region. When the calculations regarding the line segments about all of the polygon planes are finished by the above processes, the processing routine advances to step S10 in FIG. 24 and the initialization for extraction of the line segments is executed.

A check is made in step S11 to see if the line segment between the two end points has a crossing point or not. If YES, step S13 follows and the line segment is divided at the crossing point and line segments are added as shown in FIG. 18. The above processes are repeated until the judgment of the crossing point is finished with respect to all of the line segments in step S12. The processing routine advances to step S14 and the line segments after completion of the process of the crossing point was finished are rearranged. In this rearrangement, the line segments on the same slice plane are sequentially arranged in accordance with the ascending order in the direction of the Z axis, namely, in the depth direction (in accordance with the order from the small distance in the depth direction). One of the two end points which is close to the visual field with respect to each line segment is set to a starting point and the other point which is far from the visual field is set to an end point (terminal point). After completion of the rearrangement of the line segments, the initialization of the line segments is again executed in step S15. The line segments are extracted in step S16. In the extracting process of the line segments in step S16, the line segment which is hidden in a part of the visual field is divided into the following three portions: I) a portion which can be perfectly seen from the visual field; II) a portion which can be seen in dependence on the angle; and III) a portion which cannot be seen at all. The portion which cannot be seen is eliminated. With regard to the portion which can be perfectly seen, line segment data in the format according to FIGS. 11A and 11B is produced. With respect to the portion which can be seen in dependence on the angle, line segment data is produced in accordance with the data format shown in FIG. 15 or 16. The process in step S16 is repeated until the end of calculations about all of the line segments in step S17.

The processing routine advances to step S18 in FIG. 25 and magnification is set in order to convert from the processes in the virtual space so far into the processes in the real space in which the display to actually display the phase distribution and the wavelength of reference light have been determined. In the setting of the magnification in this instance, since the pixel pitch interval $P_v$ of the hologram surface in the virtual space and the pixel pitch interval $P_r$ in the real space have been predetermined, the magnification $(P_r/P_v)$ is set, the conversion of the wavelength and the number of waves into the real space according to the equations (5) and (6) is executed, and the phase calculations according to the equations (3) and (4) are executed by using the wavelength $\lambda_v$ and the number of waves $(k_v)$. After the magnification was set in step S18, sampling points are set onto the line segment every line segment at a predetermined division length, for example, at the pixel pitch interval $P_v$ on the hologram surface in the virtual space. In step S20, the distance, namely, calculating region is obtained with respect to the region on the hologram surface which is determined by the sampling points on the line segment and the observing range of the visual field, the luminance at the sampling point is further obtained, and a phase distribution is finally calculated every pixel of the calculating region. In step S21, the calculated phase distributions are added because the processes relate to the same slice plane. The processes in steps S19 to S21 are repeated until the calculations are finished with respect to all of the line segments in step S22. After completion of the calculations about all of the line segments in step S22, step S23 follows and a check is made to see if the calculations about all of the slice plane are finished or not. If NO, the processing routine is returned to step S2 in FIG. 23 and the processes regarding the next slice plane are executed. After completion of the calculations about all of the slice planes in step S23 in FIG. 25, a series of hologram information forming processed are finished.

The 1-dimensional phase distribution of each slice surface calculated as mentioned above is held into, for example, a memory of the phase calculating apparatus 22 shown in FIG. 4 and is read out when a stereoscopic display is executed by the stereoscopic display apparatus 24. For example, the corresponding phase distribution is expressed for every pixel of the liquid crystal device, the reference light is irradiated to the phase distribution from a laser light source or the like, and the reference light is converted into the wave front on the basis of the phase distribution expressed, and a solid image based on the 1-dimensional phase distribution formed is displayed.

For instance, a liquid crystal display using a nematic liquid crystal can be used as a device which is used in the stereoscopic display. Each liquid crystal element changes the phase of reference light in a range from 0 to $2\pi$ by a phase distribution signal and executes the wave front conversion to display a solid image.

According to the invention as mentioned above, an object as a display target is expressed by a polygon constructed by a set of triangular plane elements and the line segment due to the intersection of the polygon plane elements is obtained for every slice plane set in the virtual space for the phase calculation so as to be parallel with the horizontal plane. Due to this, by obtaining the 1-dimensional phase distribution in which the sampling points were set onto the line segment at regular intervals, an amount of calculations of the phase distribution of the hologram which need an extremely large amount of calculations hitherto can be remarkably reduced.

The line segments which express the target object are extracted in the virtual space in which the hologram surface, visual field, and boundary surfaces were set. Prior to the phase calculation, the processes are converted from the virtual space into the real space in which the actual display device or the wavelength of reference light were considered, thereby obtaining the 1-dimensional phase distribution. The line segment information of the target serving as a base of the phase calculation can be unconditionally obtained without being limited to the device for stereoscopic display. The phase calculation adapted to the actual apparatus can be easily executed. Further, since the technique of the hidden plane process in the computer graphics is used in the luminance calculation of the line segment, a solid image having a real stereoscopic feeling can be displayed.

The present invention is not limited to the above preferred embodiments but many variations and modifications are possible. The invention is also not limited to the numerical values shown in the embodiments.

What is claimed is:

1. A hologram information forming method comprising:

a virtual space setting step of setting into a virtual space a hologram surface to express a phase distribution, a visual field in which a solid image which is reconstructed by the phase distribution expressed on said hologram surface, and a stereoscopic display limit;

an object expressing step of expressing a target to be stereoscopically displayed into said virtual space by a set of micro polygons;

a slice plane setting step of setting a plurality of slice planes which are parallel with a horizontal plane into the virtual space including said target;

a line segment detecting step of obtaining a line segment which intersects said polygons for every said slice plane;

a line segment adjusting step of dividing or clipping said line segment as necessary;

a line segment extracting step for dividing the line segment into a portion which can be always seen from a whole region of said visual field and a portion which is obstructed by another line segment and can be seen from only a part of the visual field, thereby extracting said line segment;

a sampling step of setting sampling points onto the extracted line segment;

a phase distribution calculating step of calculating a 1-dimensional hologram phase distribution on said hologram surface every said sampling point; and a phase distribution adding step of adding said 1-dimensional hologram phase distributions calculated for the different sampling points every same slice plane.

2. A method according to claim 1, wherein in said virtual space setting step, a diagonal plane which is constructed by connecting the right and left sides of a rectangular hologram surface and the right and left sides of the visual field is set as a boundary surface indicative of the stereoscopic display limit.

3. A method according to claim 1, wherein in said virtual space setting step, an origin of 3-dimensional coordinates is set to the central position of the hologram surface and position coordinates in the virtual space are expressed by using said origin as a reference.

4. A method according to claim 1, wherein in said object expressing step, said polygon is expressed by triangular plane elements.

5. A method according to claim 1, wherein in said slice plane setting step, a plurality of slice planes are set at regular intervals.

6. A method according to claim 1, wherein in said line segment adjusting step, the portion locating on the outside of the boundary surface of said stereoscopic display limit is clipped with respect to the line segment in the slice plane, thereby adjusting the line segment in the display limit.

7. A method according to claim 1, wherein in said line segment adjusting step, two or more line segments which intersect in the slice plane are divided at a crossing point.

8. A method according to claim 1, wherein in said line segment extracting step, a group of end points on both sides of the line segment and two points which limit a degree of observation of the line segment is produced as one line segment information.

9. A method according to claim 8, wherein in said line segment extracting step, with respect to the line segment which can be seen from the whole region of the visual field, a group of end points on both sides of the line segment and end points on both sides of the visual field is produced as one line segment information.

10. A method according to claim 8, wherein in said line segment extracting step, with respect to the line segment which can be seen from a part of the visual field, end points of another line segment which limits the observation are produced as line segment information.

11. A method according to claim 1, wherein in said sampling step, sampling points are set onto the extracted line segment at regular intervals.

12. A method according to claim 11, wherein the set interval of the sampling points is set on the basis of a resolution of the human eyes at which an array of said sampling points can be seen as continuous line when it is seen from a position that is away from said array of the sampling points by a predetermined distance.

13. A method according to claim 12, wherein the distance to a visual point to decide the interval of the sampling points is set to a distance between the hologram surface set in the virtual space and the visual field.

14. A method according to claim 1, wherein in said phase distribution calculating step, a magnification is set for the information of the line segment obtained in the virtual space so as to be adapted to a condition of the real space to perform the stereoscopic display.

15. A method according to claim 14, wherein the magnification setting in the phase distribution calculating step is executed on the basis of a ratio of a pixel pitch interval of the hologram surface set in the virtual space and a pixel pitch interval of a display to display the hologram phase distribution in the real space.

16. A method according to claim 1, further comprising:
   a phase distribution expressing step of expressing the calculated 1-dimensional phase distribution; and
   a stereoscopic display step of irradiating a reference light to the phase distribution expressed in said phase distribution expressing step and converting the reference light into a wave front, thereby allowing a solid image to be recognized.

17. A method according to claim 1, wherein for said phase distribution calculating step, the 1-dimensional hologram phase distributions calculated for every slice planes are arranged in the vertical direction, thereby expressing a phase distribution of the whole hologram.

* * * * *

UNITED STATES PATENT AND TRADEMARK OFFICE
CERTIFICATE OF CORRECTION

PATENT NO. : 5400,155
DATED : March 21, 1995
INVENTOR(S) : Ueda et al

It is certified that error appears in the above-indentified patent and that said Letters Patent is hereby corrected as shown below:

Front Page [75] after "Kawasaki" insert ---shi--

[73] after "kawasaki" insert ---shi--.

Col. 5, line 27, delete "$3" and insert --S3-- line 31, delete "$2" and insert --S2-- line 32, delete "$4" and insert --S4-- line 36, delete "$5" and insert --S5-- line 56, delete "$4" and insert --S4--; delete "$6" and insert --S6-- line 62, delete "$6" and insert --S6--.

Col. 6, line 2, delete "$7" and insert --S7-- line 9, delete "$7" and insert --S7-- line 16, delete "$8" and insert --S8-- line 19, delete "$9" and insert --S9-- line 31, delete "lp" after "1000" and insert --$\ell$p--

UNITED STATES PATENT AND TRADEMARK OFFICE
CERTIFICATE OF CORRECTION

PATENT NO. : 5400,155
DATED : March 21, 1995
INVENTOR(S) : Ueda et al

Page 2 of 4

It is certified that error appears in the above-indentified patent and that said Letters Patent is hereby corrected as shown below:

Col. 6, line 36, insert paragraph indentation beginning with "For".

Col. 7, line 36, delete "$5" and insert --S5-- line 36, delete "$6" and insert --S6--.

line 64, delete "#" and insert --#001,--.

Col. 8, line 40, delete "P2" and insert --P12--.

Col. 9, line 34, delete "line" and insert --light--.

Col. 10, line 60, delete "$\gamma$" and insert --$\gamma$--.

Col. 13, line 4, delete "P" and insert --Pr-- line 17, delete "$3" and insert --S3-- line 20, delete "$2" and insert --S2-- line 26, delete "$4" and insert --S4-- line 30, delete "$5" and insert --S5-- line 35, delete "$3" and insert --S3-- line 35, delete "$6" and insert --S6--

UNITED STATES PATENT AND TRADEMARK OFFICE
CERTIFICATE OF CORRECTION

PATENT NO. : 5400,155  
DATED : March 21, 1995  
INVENTOR(S) : Ueda et al

Page 3 of 4

It is certified that error appears in the above-indentified patent and that said Letters Patent is hereby corrected as shown below:

Col. 13,    line 43, delete "$7" and insert --S7-- line 45, delete "$6" and insert --S6--.

Col. 14,    line 48, delete "$21" and insert --S21-- line 51, delete "$21" and insert --S21-- line 53, delete "$22" and insert --S22-- line 54, delete "$22" and insert --S22-- line 54, delete "$23" and insert --S23-- line 57, delete "$2" and insert --S2-- line 60, delete "$23" and insert --S23--.

UNITED STATES PATENT AND TRADEMARK OFFICE
CERTIFICATE OF CORRECTION

PATENT NO. : 5,400,155
DATED : March 21, 1995
INVENTOR(S) : Ueda et al

It is certified that error appears in the above-indentified patent and that said Letters Patent is hereby corrected as shown below:

Col. 16, claim 12, line 61, delete "claim 11" and insert ---claim 1---.

Signed and Sealed this

Fifteenth Day of August, 1995

Attest:

BRUCE LEHMAN

Attesting Officer    Commissioner of Patents and Trademarks